United States Patent [19]

Ide

[11] Patent Number: 5,007,490

[45] Date of Patent: Apr. 16, 1991

[54] PROGRESSIVE CAVITY DRIVE TRAIN WITH ELASTOMERIC JOINT ASSEMBLY FOR USE IN DOWNHOLE DRILLING

[76] Inventor: Russell D. Ide, P.O. Box 744, 641 Arnold Rd., Coventry, R.I. 02816

[21] Appl. No.: 540,682

[22] Filed: Jun. 20, 1990

[51] Int. Cl.$^5$ .............................................. E21B 4/02
[52] U.S. Cl. ..................................... 175/107; 464/19; 418/48; 285/330; 285/913
[58] Field of Search ..................... 175/107; 464/19; 418/48; 285/330, 913, 209

[56] References Cited

U.S. PATENT DOCUMENTS

| | | | |
|---|---|---|---|
| 4,449,953 | 5/1984 | Nikomarov et al. | 464/19 |
| 4,512,596 | 4/1985 | Obrecht | 285/330 X |
| 4,679,638 | 7/1987 | Eppink | 175/107 |
| 4,821,818 | 4/1989 | Mefferd | 285/913 X |
| 4,823,889 | 4/1989 | Baldenko et al. | 175/107 |
| 4,875,531 | 10/1989 | Biehl et al. | 175/107 |

FOREIGN PATENT DOCUMENTS

446615  4/1975  U.S.S.R. .................. 175/107

Primary Examiner—William P. Neuder
Attorney, Agent, or Firm—Marks Murase & White

[57] ABSTRACT

A downhole drilling apparatus which includes a progressive cavity drive train comprising a progressive cavity device and a coupling for converting the complex motion of the rotor into simple rotation. The coupling includes two shafts coupled to one another by joint assemblies connected to opposite ends of an intermediate shaft. The joint assemblies include interleaved annular extensions from the opposite ends of the joint assembly and an elastomer filling the spaces between the annular extensions. The elastomer is highly restrained by the interleaved annular extensions, but is still flexible in shear. The moving components within the coupling are perfectly isolated from the surrounding environment; the joint assembly may further include backup features such as a thrust bearing member and radial pins locking the interleaved portions together.

24 Claims, 4 Drawing Sheets

PROGRESSIVE CAVITY DRIVE TRAIN WITH ELASTOMERIC JOINT ASSEMBLY FOR USE IN DOWNHOLE DRILLING

BACKGROUND OF THE INVENTION

This invention relates to a progressive cavity apparatus, and more particularly to drive trains for progressive cavity downhole drilling devices.

The use of progressive cavity or single-screw rotary devices is well known in the art, both as pumps and as driving motors. These devices have a single shaft in the shape of one or more helix contained within the cavity of a flexible lining of a housing. The generating axis of the helix constitutes the true center of the shaft. This true center of the shaft coincides with its lathe or machine center. Typically, the lined cavity is in the shape of a two or more helices (one more helix than the shaft) with twice the pitch length of the shaft helix. Either the shaft or the housing is secured to prevent rotation; the part remaining unsecured rolls with respect to the secured part. As used herein, rolling means the normal motion of the unsecured part of progressive cavity devices. In so rolling, the shaft and housing form a series of sealed cavities which are 180 degrees apart. As one cavity increases in volume, its counterpart cavity decreases in volume at exactly the same rate. The sum of the two volumes is therefore a constant.

When used as a motor for down hole drilling, the unsecured part or rotor produces a rotor driving motion. The driving motion of the rotor is quite complex in that it is simultaneously rotating and moving transversely with respect to the stator. One complete rotation of the rotor will result in a movement of the rotor from one side of the stator to the other side and back. The true center of the rotor will of course rotate with the rotor. However, in a typical construction, the rotation of the true center of the rotor traces a circle progressing in the opposite direction to the rotation of the rotor, but with the same speed (i.e., reverse orbit). Again, optimum performance is obtained when movement of the rotor is precisely controlled. One complete rotation of the rotor will result in one complete rotation of the true center of the rotor in the opposite direction. Thus, the rotor driving motion is simultaneously a rotation, an oscillation, and a reverse orbit. For multi-lobe motors the reverse orbit is a multiple of the rotational speed, e.g., if a three lobe motor is used the reverse orbit is three times as great as the rotational speed.

Examples of progressive cavity motor and pump devices are well known in the art. The construction and operation of such devices may be readily seen in U.S. Pat. Nos. 3,627,453 to Clark (1971); 2,028,407 to Moineau (1936); 1,892,217 to Moineau (1932) and 4,080,115 to Sims et al. (1978).

Despite the simple construction of progressive cavity devices, use of the devices as motors in driving and drilling apparatus have proven difficult. This difficulty results primarily from the failure to provide a drive train capable of handling the complex rotor driving motion (described above) in a durable, reliable and inexpensive manner. Couplings that connect the rotor of progressive cavity motors with the drill must be capable of operating in a contaminated, hostile environment while handling a very high torque and transmitting the rotational output of the rotor without the orbital motion of the rotor.

Attempts have been made to convert the complex rotor motion into rotational motion for driving a drilling shaft. Of the couplings which have been used in progressive cavity devices, the most commercially successful has been a universal joint attached to the driving end of the rotor and connected to a universal joint attached to the driven drill shaft. As is known, such U-joints react or resolve the orbital motion by the sliding of pin members in a universal assembly. Thus, such joints typically include elements which slide relative to one another.

Figure 3:
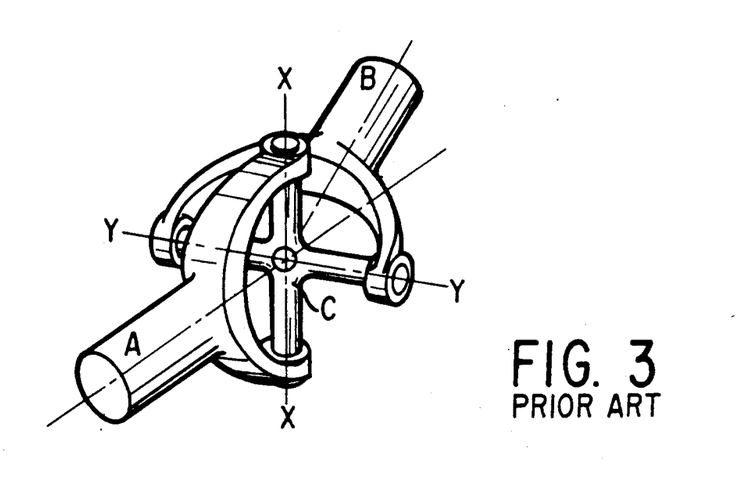
FIG. 3 is a perspective view of a conventional universal joint assembly.

The principal on which the Hooke's type of universal assembly works is illustrated in FIG. 3. The shaft A is formed into a fork or yoke at its end and pivoted between the prongs of this fork is a cross-piece C. The cross-piece C can therefore pivot about the XX relatively to the shaft A. The other shaft B similarly includes a fork or yoke at its end and the other arms of the cross are pivoted between the prongs of this fork. The shaft B can therefore pivot about the axis YY relative to the cross C and, since the latter can pivot about the axis XX relative to the shaft A, the shaft B can assume any angular position relative to shaft A. It follows that if the shafts A and B are supported in bearings with their axes at an angle, then when the shaft A is turned about its axis, the motion is communicated to the shaft B and it turns about its axis; the arms of the cross meanwhile oscillating in the prongs of the forks.

The axes XX and YY intersect at 0 and are perpendicular to one another. The axes of the arms of the cross C are also perpendicular to their respective shafts. The axes of the shafts A and B also intersect at 0, which point is commonly referred to as the "center" of the joint.

Although FIG. 3 shows a specific pivoting connection, it does not matter how the pivoting action is obtained. All that is required is that the shaft B shall be able to pivot independently about two intersecting perpendicular axes such as XX and YY, relatively to shaft A. There are many known constructions for achieving this result.

Figure 2A:
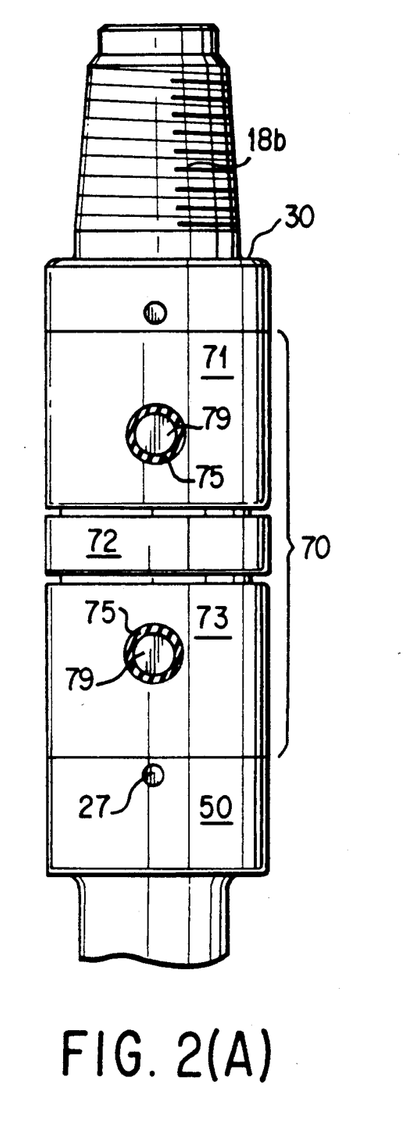
Figure 2B:
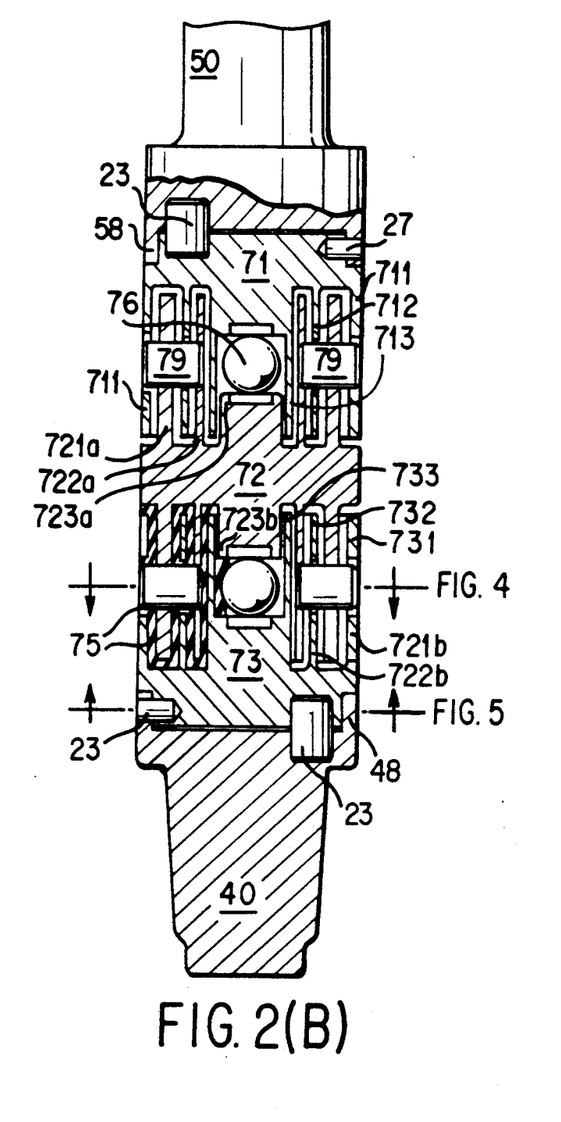

The single Hooke's type of universal assembly described above suffers from a disadvantage which is obviated in some other forms of the joint. Specifically, when two shafts are connected by a single Hooke's joint and one of these shafts is rotating at an absolutely constant speed, then the other shaft will not rotate at a constant speed but at a speed that is, during two parts of each revolution, slightly greater and, during the other two parts of the revolution, slightly less than the constant speed of the first shaft, i.e., the velocity varies cyclicly. The magnitude of this fluctuation in speed depends on the angle between the axes of the two shafts, being 0° when that angle is 0° but becoming considerable when the angle is large. This disadvantage becomes of practical importance in applications such as downhole drilling where it is important to maintain a constant speed. The disadvantage can be obviated by using two Hooke's joints arranged (as shown in FIGS. 2A and 2B) with an intermediate shaft arranged so that it makes equal angles between the first and second stub shafts and the pivot axes of the intermediate shaft being arranged parallel to each other. The irregularity introduced by one joint is then cancelled out by the equal and opposite irregularity introduced by the second joint.

Past attempts to apply universal joints to downhole motors have suffered from several disadvantages, particularly in the area of reliability. The primary reason for this is that the fluids used in progressive cavity drilling apparatus often are or quickly become abrasive. This abrasive fluid flows between the relative moving (sliding) surfaces of the U-joint causing rapid wear.

In the past, there have been attempts to isolate the sliding pivot surfaces of a universal from contaminants or heavy vibrations. Examples of such constructions are shown in U.S. Pat. Nos. 2,727,370 to Holland; 3,262,284 to Maxwell-Holroyd; 3,545,232 to Neese et al.; and 4,861,314 to Mazziotti. However, in such known cases there is always sliding between the seal and one of the surfaces of the U-joint components. As a result of this sliding, the seal is not truly hermetic and the U-joint components are not perfectly isolated. Thus, the possibility of contamination exists, particularly in a high pressure application such as down hole drilling.

Another type of universal joint assembly for use in downhole motor drives is disclosed in U.S. Pat. No. 4,772,246 to Wenzel. This patent discloses a pressure equalization arrangement which significantly reduces the pressure differential across the seal. As a result, the likelihood of leakage of drilling mud into the universal joint is reduced. Despite the advantages it offers, this construction is complicated and expensive. Further, the U-joint components are not perfectly isolated because the seal is not hermetic. Consequently, there is some possibility of contamination of the U-joint assembly.

Thus, while the need to seal, to some extent, the components of a U-joint has been recognized, the need to perfectly isolate these components and a reliable means of achieving this are not known in the prior art.

SUMMARY OF THE INVENTION

The present invention relates to an improved drilling apparatus which includes a drill string, a progressive cavity device, and a drill bit. The progressive cavity device is connected to the lower end of the drill string and includes a stator, a rotor within the stator, and means for flowing fluids through the stator to drive the rotor. The coupling has a first stub shaft, a second stub shaft and intermediate shaft and a pair of sealed joint assemblies. The intermediate shaft is coupled, via the joint assemblies, to the first stub shaft at one end and the second stub shaft at the other end. The connection of the shafts via the joint assemblies is such that the coupling functions somewhat like a double Hooke's joint. The drill bit has a tubular housing connected to the second end of the second stub shaft for rotation with the second stub shaft. The coupling converts the complex rotor motion into rotational drilling motion about an axis displaced from and parallel to said rotor axis.

The present invention obviates the problems associated with known progressive cavity devices by providing a progressive cavity drive train including a progressive cavity device and a hermetically sealed coupling which converts the complex motion of the rotor into simple rotation of the drill shaft. The drive train is inexpensive, reliable and durable in comparison to known progressive cavity drive trains.

The progressive cavity drive train progressive cavity drive train includes a housing structure, a stator having a longitudinal axis, a rotor having a true center and being located within the stator, first and second stub shafts and an intermediate shaft coupling the stub shafts through sealed joint assemblies in a universal type fashion.

The stator and the rotor have coacting helical lobes in contact with one another at any transverse section. The stator has one more helical lobe than the rotor such that a plurality of cavities are defined between the rotor and the stator. The rotor is adapted to rotate within the stator such that the true center of the rotor orbits the axis of the stator; the orbit has a predetermined radius. The orbit is constant and not subject to change such that the rotor motion can be precisely controlled. The orbit of the rotor causes progression of the cavities in the direction of the axis of the stator.

The first stub shaft has a longitudinal axis and first and second longitudinal ends. The first end of the first stub shaft is connected to and movable with the rotor. The second end of the first stub shaft is formed into a portion or directly connected to a portion of a sealed joint assembly.

The second stub shaft has a longitudinal axis which is substantially colinear with the axis of the stator and first and second longitudinal ends. The second stub shaft is supported in the housing so that its longitudinal axis is fixed and the second stub shaft is rotatable about its longitudinal axis. The second end of the second stub shaft is formed into a portion of or directly connected to a portion of a joint assembly.

The intermediate shaft member is formed into or directly connected to a portion of a joint assembly at each end thereof. In this way, the intermediate shaft is coupled, through the joint assemblies, to the first stub shaft at one end and the second stub shaft at the other end such that the first, intermediate and second shafts are pivotally connected to one another via the joint assemblies in a manner similar to that of a double Hooke's joint.

By virtue of this construction, the first stub shaft can rotate about its axis and orbit about the axis of the second stub shaft at the same time the second stub shaft rotates about its longitudinal axis. In this way, the complex rotor motion is resolved into simple rotation for driving the drill assembly of a downhole drill.

As described above, the drive train of the present invention includes a progressive cavity device and a sealed coupling. The progressive cavity driving device includes the stator, the cavity within the stator, the rotor within the stator cavity, and a passageway for flowing fluids through the stator. The sealed coupling includes the offset stub shafts, the intermediate shaft and the joint assemblies coupling the stub shafts.

In operation, flow of fluids through the stator cavity produces the complex rotor driving motion. The sealed coupling is secured to the end of the rotor projecting from the fluid discharge end of the stator. The coupling converts or resolves the rolling of the rotor into a rotational motion substantially about a single axis at the same or similar speed.

The present inventor has found that couplings, when used downhole, are most reliable when the sliding components of the joint are perfectly isolated from the surrounding environment. Further, the present inventor has discovered that, despite the relative movement between coupling components, it is possible to perfectly isolate or hermetically seal the relatively moving surfaces in a coupling used in a progressive cavity downhole drilling drive train. In part, the present invention is the result of the present inventor's recognition that universal joints can be designed to resolve the complex motion of a downhole drilling progressive cavity drive train without large angular deviations between adjacent shafts in the universal assembly. In fact, by making the coupling sufficiently long, the rotor motion can be resolved by a coupling without skewing the shaft portions by more than 5°. This means that, in a coupling for a downhole drilling assembly, the amount of movement between the relatively movable portions is normally less than 0.05 inches. It follows that couplings specifically designed for use in downhole drilling progressive cavity devices do not need to have the flexibility typically required of universal type couplings. Recognizing this has enabled the present inventor to design a coupling with limited, but sufficient, flexibility and perfectly isolated sliding components.

Thus, the present invention relates to a progressive cavity drive train in which the complex rotor motion is resolved by a coupling (preferably having elastomeric joint assemblies, at each end of the coupling) which is modified such that the moving surfaces within the joint assembly are perfectly isolated.

The joint assembly includes longitudinally arranged first, second and third portions or sections. A plurality of concentric annular extensions are secured to each of the second end of the first portion, the first end of the third portion and the first and second ends of the second portion. The concentric annular extensions formed on the first and third portions are spaced so as to fit within spaces between the concentric annular extensions formed on the second portion such that the annular extensions on the first and third portions can be interleaved with the annular extensions on the second portion. When so interleaved, there remains a space between the interleaved annular extensions such that a plurality of concentric annular spaces are provided. These spaces are entirely filled with an elastomer. The elastomer is bonded to the annular extensions. Because the elastomer is highly restrained by the annular extensions in the radial direction, the elastomer is substantially incompressible in the longitudinal direction. On the other end, because the elastomer is relatively unrestrained longitudinally, the elastomer is flexible in high and shear. By virtue of the elastomer connection between the longitudinally arranged joint portions, these portions are pivotable with respect to one another in all directions. Consequently, the coupling is flexible. However, because the relatively moving surfaces are completely isolated from the surrounding environment by virtue of the elastomer, there is no risk that abrasives will not enter between the relatively moving surfaces of the respective joint portions.

According to the other aspects of the present invention, the joint assemblies may further include one or more thrust bearing members directly connecting the second portion to the first and third portions so as to allow thrust to be directly transmitted through these portions. Preferably, the thrust member is in the form of a ball such that contact between adjacent portions is at a single point and does not inhibit pivoting.

Further, the joint assemblies may include one or more radially extending pins to provide a backup connection for the interleaved annular sections in the event of elastomer failure. Preferably, the pins extend radially through the joint assembly and are tightly connected to one set of annular extensions but spaced from holes formed in the other set of annular extensions. Because of the space in between the pins and one set of annular extensions, the pin does not, in normal use, affect pivoting of the coupling portions with respect to one another. However, the pins help to ensure that the interleaved annular portions remain interleaved even if the elastomer becomes degraded.

BRIEF DESCRIPTION OF THE DRAWINGS

Other objects, features, and advantages of the present invention are hereinafter set forth and explained with reference to the drawings wherein:

FIG. 2 (PARTS A and B) is a side view, partially in section, of the sealed coupling of the present invention in which the rubber within the joint assembly is partially omitted for clarity.

DETAILED DESCRIPTION OF THE DRAWINGS

Figure 1:
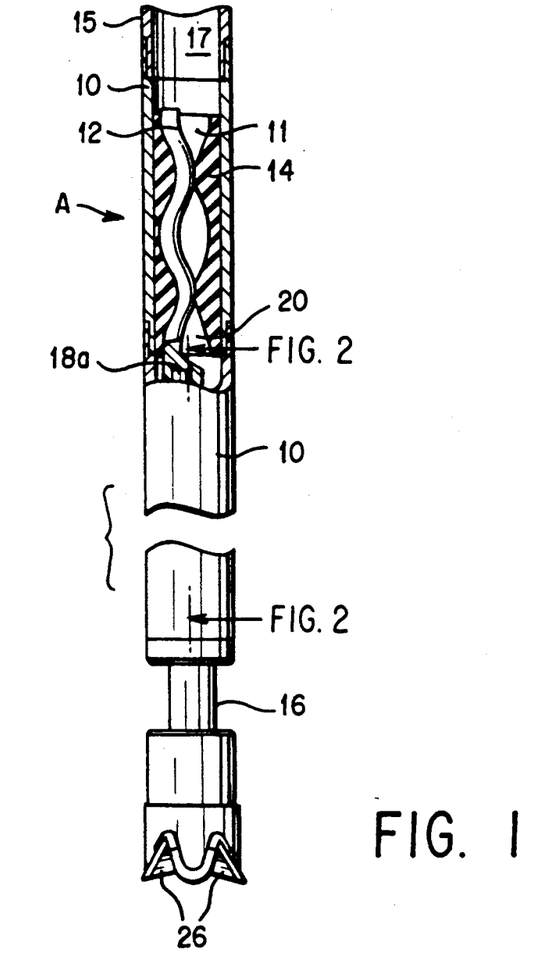
FIG. 1 is an elevation view partly in section of the overall structure of the downhole drilling apparatus of the present invention.

FIG. 1 shows the overall structure of a progressive cavity drilling apparatus using the progressive cavity drive train of the present invention. The apparatus includes a drill string 15, a progressive cavity drive train, a drill bit drive shaft 16 and a drill bit 26. The drive train of the present invention comprises a progressive cavity device and a sealed coupling for converting the motion of the rotor of the progressive cavity device, i.e., orbiting of the rotor and the rotational motion of the rotor, into rotation about a single axis at the same speed.

As illustrated in FIG. 1, the progressive cavity device A has a stator, a rotor, a passageway 11 for fluid to enter between the stator and the rotor, and a passageway 20 for the fluid to exit therefrom. In the drawings, the housing 10 and its flexible lining 14 are held against movement so that they function as the stator in the device A and the shaft 12 functions as the rotor. The housing 10 is tubular and its interior communicates with inlet 11 in the top portion of the lining 14 to provide a passageway for fluid to enter the progressive cavity device A. Outlet 20 in the bottom portion of the lining 19 serves as the passageway for fluid to discharge from the progressive cavity device A. The shaft 12 is precisely controlled so as to roll within the lining 14. The progressive cavity device A is attached to the lower end of a drill string 15.

The lower end of the rotor shaft 12 includes a shaft connection 18a. The shaft connection allows the rotor 12 to be directed to a stub shaft of the coupling (described below). The coupling is located in the lower part of the housing 10 and is not visible in FIG. 1. As noted above, one end of the coupling is directly connected, by threading splining or the like, to the rotor shaft 12. The other end of the coupling is similarly connected to a drill bit drive shaft 16. Typically, the coupling includes separate stub shafts which are connected to the rotor shaft 12 and drive shaft 16 by connecting means such as threads, splines and the like. Of course, a stub shaft could be integrally formed (connected) to either of these shafts, if desired. The drill bit drive shaft 16 is rotatably connected to a conventional drill bit 26.

The progressive cavity train of the present invention functions as a fluid motor or driving apparatus for driving the drilling apparatus shown in FIG. 1. Thus, a pressurized fluid, typically water carrying suspended particles commonly referred to as "mud", is forced into the progressive cavity device. The rotor 12 responds to the flowing fluid to produce a rotor driving motion which is simultaneously a rotation, an oscillation, and a orbit. The coupling, described below, attached to the rotor 12 at connection point 18a and aligned with the true center 28 of the rotor described above converts this rotor driving motion into rotational driving motion substantially about a single axis.

FIG. 2 (Parts A and B) shows the general construction of the coupling of the present invention. Specifically, the coupling includes a first stub shaft 30, a second stub shaft 40, an intermediate shaft 50 and two elastomeric joint assemblies 70.

The elastomeric joint assemblies 70 which are described in greater detail below, connect the first stub shaft 30 to the intermediate shaft 50 at one end thereof and connect the second stub shaft 40 to the intermediate shaft 50 at the other end of the intermediate shaft 50.

The stub shafts 30, 40, each including a connection portion 18b which allows the stub shafts to be connected to either the rotor 12 or the drill bit drive shaft 16 in the manner described above. Although a specific connecting means is shown, i.e., threads on the ends of the stub shaft, other connecting means such as splines or the like could be employed. Additionally, as mentioned above, the stub shafts could be formed integrally with either the rotor shaft 12 or the drill bit drive shaft 16.

The end of the stub shafts opposite the end having the connecting portion 18b is formed with a joint assembly receiving portion. In the illustrated embodiment, the specific structure used is a short sleeve-like member, such as that shown at 48 in FIG. 2, which fits over the end of the joint assembly and allows the stub shaft 40 to be secured to the joint assembly by means of one or more longitudinally extending pins 23 and one or more radially extending pins 27. In this way, the stub shafts are securely connected to one end of the elastomeric joint assembly and, in effect, function as an integral part of that end of the elastomeric joint assembly. It is possible to form the stub shaft integrally with an end of the joint assembly, however, this might complicate manufacture.

The intermediate shaft 50 is formed with a similar coupling connecting arrangement 58 at its two longitudinal ends so that each end of the intermediate shaft 5 can be fixedly connected to an end of a elastomeric joint assembly 70 through the use of radial pins 27 and longitudinal pins 23, as described above. Again, the intermediate shaft could be made integral with the portion of the joint assembly to which it is fixed, but this might complicate manufacture.

Figure 5:
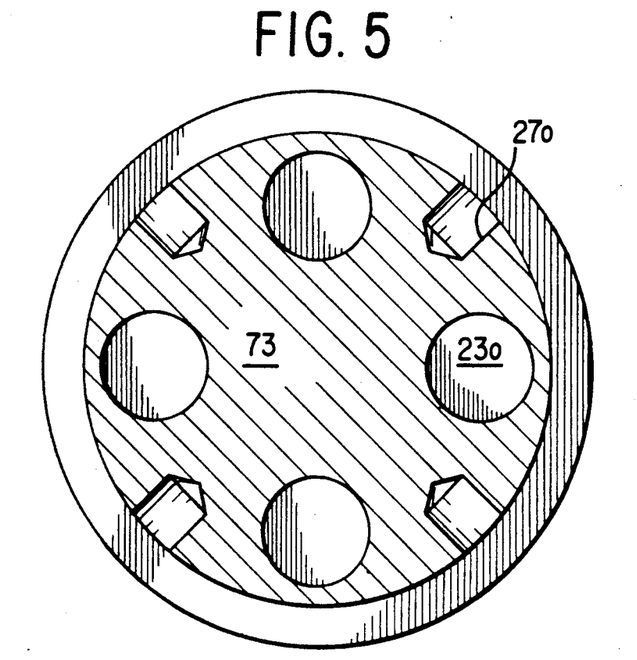
FIG. 5 is a cross section along the lines indicated in FIG. 2.

The longitudinal pins 23 and radial pins 27 are received in radial pin receiving openings 27o and longitudinal pin receiving openings 23o formed in an end of the elastomeric joint assembly 70 as shown in FIG. 5. In the illustrated embodiment, the end of the elastomeric joint assembly 70 includes 4 radial openings 27o for receiving 4 radial pins 27 and 4 longitudinal openings 23o for receiving 4 longitudinal pins 23. Of course, more or less pins or even other forms of connection can be used.

As detailed below, the couplings each include three longitudinally aligned shaft portions which are joined together by highly restrained rubber or some other elastomer in a way which makes the elastomer longitudinally incompressible yet flexible in shear. This connection allows each of the three shaft portions to pivot to a limited degree with respect to an adjacent portion in any direction.

As noted above, the portions located at either end of the joint assembly are secured to a shaft (either a stub-shaft or the intermediate shaft) and the overall coupling assembly includes a stub shaft, a joint assembly, an intermediate shaft, another joint assembly and a second stub shaft. This overall assembly has flexibility somewhat similar to that of a conventional double Hooke's joint universal except that the direction of pivoting of the coupling portions with respect to one another is not limited as with a double Hooke's joint. Although this gives the coupling of the present invention somewhat greater flexibility, it could present a problem. Because the axes of pivoting of the coupling portions with respect to one another cannot be precisely controlled, the ability to eliminate cyclic variations in output speed can be lost. As noted above, one of the advantages of the double Hooke's joint is that the pivoted axes are arranged such that cyclic velocity variations at each universal joint are cancelled thereby giving a constant output speed. This result will not necessarily be obtained using a rubber coupling such as that disclosed herein wherein the pivoting within the coupling can be about any axis.

Although the coupling is not, strictly speaking, a double Hooke's joint, it is nevertheless expected that, as used in the present invention, the output will have a substantially constant velocity for at least two reasons. First, the angle of deviation of the shaft portions used in the present invention is typically less than 5°. As noted above, as the angle of deviation approaches 0° the velocity variation becomes minimal or even insignificant. Further, because the two joint assemblies used are identical but spaced they will tend to operate out of phase such that any minimal velocity variations will be cancelled out. If it is critical to avoid any velocity variation whatsoever, the joint assemblies could be forced to operate out of phase for this purpose. However, this is not believed necessary for downhole drilling because absolute constant velocity is not required.

Figure 6:
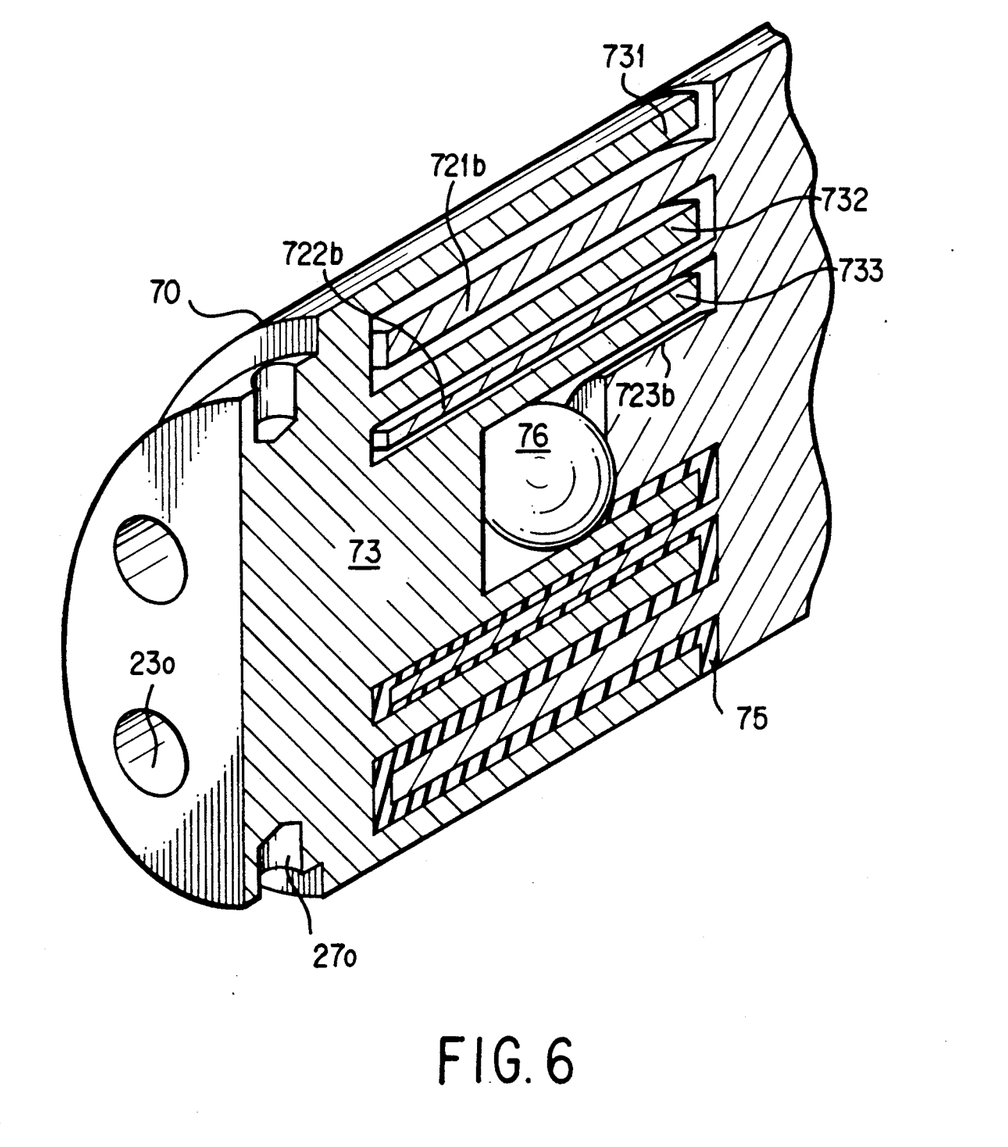
FIG. 6 is a cutaway partial perspective view of the coupling with pins and rubber omitted for clarity.

The construction of the elastomeric joint assembly 70 will now be described in greater detail with reference to FIGS. 2, 4 and 6. In these drawings, the elastomer 75 which fills the spaces between and is bonded to the respective portions 71, 72 and 73 of the joint assembly is largely omitted so that the arrangement of the other components can be better understood. It is, however, an important aspect of the present invention that elastomer fills all the voids between the respective portions and other components such that there are no sliding surfaces within the joint assembly and the relatively moving portions are perfectly isolated so that the joint assembly itself is perfectly isolated from the surrounding environment. Further, because the elastomer is bonded to the annular extensions, the respective portions are securely connected to one another.

As best shown in FIG. 2, the elastomeric joint assembly 70 includes three longitudinal aligned components namely, a first end component 71, an intermediate component 72 and a second end component 73. Each of the portions 71, 72 and 73 are formed of a rigid, high strength, material such as high strength 4140 steel or the like.

The construction of the first and second end components 71, 73 is essentially identical. Each of these components is either formed integrally with a shaft portion or, as in the illustrated embodiment, has a shaft connecting structure. As best seen in FIG. 5, the shaft connecting structure of the illustrated embodiment comprises a reduced outer diameter portion which is adapted to fit into the sleeve 48, 58, 38 formed at the ends of the shaft portions and one or more radial pin receiving openings 27o and longitudinal pin receiving openings 23o. The pin receiving openings 27o and 23o are adapted to receive radial locking pins 27 and longitudinal locking pins 23, respectively, so as to fix the joint assembly to the shaft portion. Naturally other forms of shaft connecting structures such as threads and the like can be employed.

The other end of the end portions 71, 73 is formed with a plurality of concentric annular extensions. Specifically, in the illustrated embodiment, the first end portion 71 is formed with three concentric annular extensions, 711, 712 and 713. Likewise, the second end portion 73 is formed with three annular extensions 731, 732, and 733.

The intermediate portion 72 has a plurality of annular extensions extending from both longitudinal ends thereof. Specifically, the first end is formed with three annular extensions 721a, 722a and 723a. The other end includes three identical annular extensions 721b, 722b and 723b.

The annular extensions formed on the intermediate member 72 are arranged such that they can be fitted into the spaces between the annular extensions formed on the first and second end portions 71, 73. Likewise, the annular extensions formed on the end portions 71, 73 are spaced so that they can fit into the spaces between the annular extensions formed on the intermediate member 72. Thus, the end portions 71, 73 and the intermediate portion 72 can be assembled as shown in FIG. 2 with the annular extensions of the various portions interleaved.

In the assembled state as shown in FIG. 2, an annular space remains between each of the interleaved annular extensions as well as a longitudinal space between the ends of each annular extension and the adjacent portion of the joint assembly. In accordance with the present invention, the spaces between the portions 71, 72 and 73 of the joint assembly are filled with an elastomer such as rubber which is bonded to the surface of the portions 71, 72 and 73. The elastomer completely fills the spaces. However, only a portion of the elastomer is shown so that the other portions of the assembly can be more easily seen. Because these spaces are relatively narrow in the radial direction, the elastomer which fills these spaces is highly restrained. As is known, when elastomer such as rubber is highly restrained as in the joint assembly of the present invention, the elastomer becomes virtually incompressible in the longitudinal direction. Thus, the joint assembly including the portions 71, 72 and 73 and the elastomer between these portions is essentially incompressible in the longitudinal direction. However, because the elastomer is not so highly restrained for pivoting type movement, the joint is still flexible in shear. Consequently, the portions 71, 72 and 73 have some degree of flexibility with respect to their adjacent portions in all radial directions.

As described heretofore, it is believed that the joint assembly is adequate for the purpose of resolving the complex rotor movement into simple rotation of the drill bit driving shaft. However, it is presently believed that the joint assembly should include several additional structural features to increase the reliability and prevent catastrophic failure. Specifically, it is preferred that the joint assembly further include thrust carrying elements such as balls 76 to allow metal-to-metal transmission of thrust forces. Because the balls 76 contact each of the portions 71, 72 and 73 at a single point their provision does not hinder the pivoting of these portions with respect to one another. Thus, while it is not believed necessary to provide such thrust balls (the highly restrained elastomer alone is believed to be sufficient to transfer thrust forces) the provision of the balls may prove helpful should the elastomer become degraded.

Figure 4:
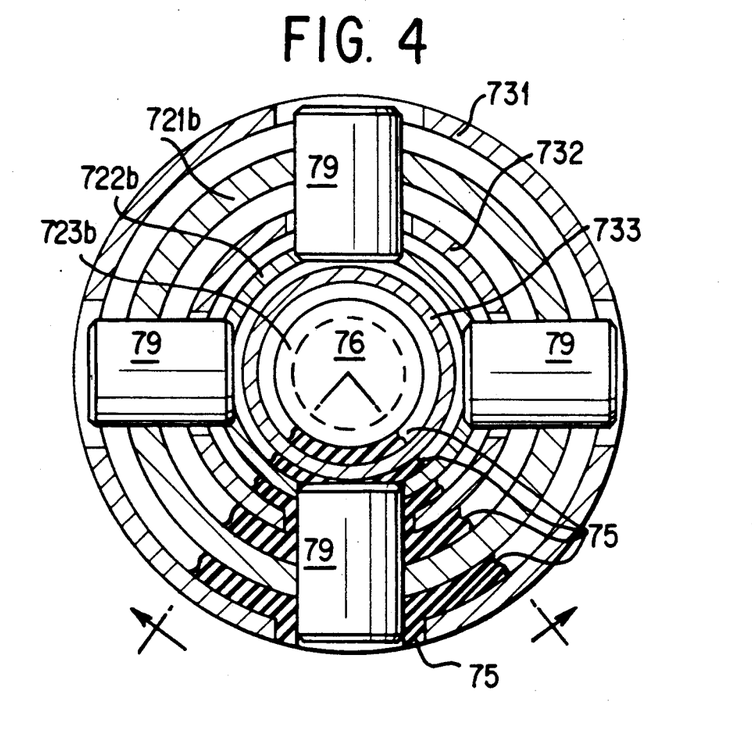
FIG. 4 is a cross section along the lines indicated in FIG. 2.

Another safety feature is the provision of radially extending pins as best shown in FIGS. 2 and 4 to provide a backup connection for the interleaved annular sections of the portions 71, 72 and 73 in the event of elastomer failure. As shown best in FIG. 4, the pins 79 fit tightly into holes formed in the annular extensions of one of the portions (in this case the intermediate portion 72) but are spaced from holes formed in the other portion (in this case the extensions of the first end portion 71). Because of the spacing between the pin 79 and the annular extensions of the end portions 71 and 73, elastomer extends between the pin and these extensions such that the pin 79 does not, in normal use, affect pivoting of the portions 71, 72 and 73 with respect to one another. However, the pins 79 help to ensure that the interleaved annular portions remain interleaved even if the elastomer 75 becomes degraded.

In operation, the flexibility of the portions 71, 72 and 73 of the elastomeric joint assemblies 70 allow a Hooke's joint type motion between the shafts connected by the joint assembly. Of course, as noted above, there is some additional flexibility owing to the fact that the respective portions 71, 72 and 73 of the joint assembly can pivot with respect to one another in any direction. The provision of two such joint assemblies and the intermediate shaft 50 between the two stub shafts 30 and 40 makes it possible for the coupling to resolve complex motion of the rotor 12 into simple rotation of the drill bit drive shafts 16.

Further, because the spaces between the surfaces of the elements which move relative to one another, i.e., the surfaces of the portion 71, 72 and 73 of the elastomeric joint assembly 70, are completely filled with elastomer, they are perfectly isolated from the surrounding environment such that the coupling cannot be adversely affected by the presence of abrasives.

Thus, it can be appreciated that the use of the elastomeric joint assemblies between the respective stub shafts and the intermediate shaft allows a resolution of the complex rotor motion into simple rotation of the drill bit drive shaft in a hermetically sealed environment. This solves the problems experienced in the prior art which employ non-hermetically sealed universal assemblies.

What is claimed is:

1. A downhole drilling apparatus which includes a progressive cavity drive train comprising:
    a housing structure;
    a stator, the stator having a longitudinal axis;
    a rotor having a true center, the rotor being located within the stator;
    the stator and the rotor each having coacting helical lobes which are in contact with one another at any transverse section, the stator having one more helical lobe than the rotor such that a plurality of cavities are defined between the rotor and the stator, and the rotor being adapted to rotate within the stator such that the true center of the rotor orbits the axis of the stator, the orbit having a predetermined radius and the orbiting motion of the rotor causing a progression of the cavities in the direction of the axis of the stator;

a first stub shaft having a longitudinal axis and first and second longitudinal ends, the first end of the first stub shaft being connected to and movable with the rotor;

a first joint assembly fixed to the second end of the first stub shaft; the joint assembly comprising first, second and third longitudinally arranged joint portions, the first portion and the second portion being coupled through an elastomer so as to be pivotable with respect to one another, the second portion being coupled to the third portion through an elastomer so as to be pivotable with respect to one another, the first portion of the first joint assembly being fixed to the first stub shaft;

an intermediate shaft having first and second ends, the first end being fixed to the third portion of the first joint assembly;

a second joint assembly, the second joint assembly comprising first, second and third longitudinally arranged joint portions, the first portion and the second portion being coupled through an elastomer so as to be pivotable with respect to one another, the second portion being coupled to the third portion through an elastomer so as to be pivotable with respect to one another, the first portion of the second joint assembly being fixed to the second end of the intermediate shaft;

a second stub shaft having a longitudinal axis which is substantially colinear with the axis of the stator and first and second longitudinal ends, the second stub shaft being rotatably mounted about its longitudinal axis within the housing structure, the first end of the second stub shaft being fixed to the second end of the intermediate shaft, the second end of the second stub shaft being connected to a drill bit drive shaft; and whereby the first and second stub shafts are coupled such that in response to the flow of fluid through the stator the first stub shaft can rotate about its axis and orbit about the axis of the second stub shaft at the same time the second stub shaft rotates about its longitudinal axis so as to cause rotation of the drill bit drive shaft.

2. The drilling apparatus of claim 1, wherein the first stub shaft is integrally connected with the rotor.

3. The drilling apparatus of claim 1, wherein the second stub shaft is rotatably supported in the housing structure by bearings.

4. The drilling apparatus of claim 1, further comprising a drill bit operatively connected to and driven by the drill bit drive.

5. The drilling apparatus of claim 1, wherein the joint assemblies between the first stub shaft and the intermediate shaft and the second stub shaft and the intermediate shaft each include a plurality of concentric annular extensions secured to each of the second end of the first joint portion, the first end of the third joint portion and the first and second ends of the second joint portion, the concentric annular extensions formed on the first and second joint portions being spaced so as to fit within spaces between the concentric annular extensions formed on the second joint portions such that the annular extensions on the first and third joint portions can be interleaved with the annular extensions on the second joint portion, the joint assemblies further comprising an elastomeric layer between the interleaved annular extensions of the joint portions, the elastomeric layer being flexible in shear so as to allow pivoting of the first and third joint portions with respect to the second joint portion.

6. The drilling apparatus of claim 5, wherein the joint assembly further comprises a thrust load bearing element in direct contact with both the first and second portions and another thrust load bearing element in direct contact with both the second and third portions such that thrust loads can be directly transmitted through the first, second and third portions and the thrust bearing element.

7. The drilling apparatus of claim 5, wherein the joint assembly further comprises at least one radial pin extending through each of the interleaved annular extensions of two adjacent portions, the radial pin being in direct contact with the annular extensions of one of the portions and spaced from the extensions of the other portion so as to flexibly interlock the interleaved annular extensions.

8. A drilling apparatus comprising,
a drill string;
a progressive cavity device connected to the lower end of the drill string and comprising a stator having a longitudinal axis, a rotor within the stator, the rotor having a true center, and a passageway for flowing fluids through the stator to drive the rotor as so to cause the true center of the rotor to rotate and orbit about the axis of the stator;
a coupling having first and second ends, a first stub shaft at the first end and a second stub shaft at the second end, and an intermediate shaft located between the first and second stub shafts, the intermediate shaft being connected at one distal end thereof to the first stub shaft via a sealed joint assembly and the intermediate shaft being connected at the other distal end thereof to the second stub shaft via a sealed joint assembly, each of the sealed joint assemblies comprising first, second and third longitudinally arranged portions, the first portion and the second portion being coupled through an elastomer so as to be pivotable with respect to one another, the second portion being coupled to the third portion through an elastomer so as to be pivotable with respect to one another, the first portion being fixed to one of the shaft portions coupled by the joint assembly and the third portion being fixed to the other of the shaft portions coupled by the joint assembly such that the shaft portions coupled by the joint assembly are pivotable with respect to one another;
wherein the first stub shaft of the coupling is attached to the rotor and has its axis aligned with the true center of the rotor for rotation therewith; and
a drill bit having a tubular housing connected to the second stub shaft of the coupling so as to rotate with the second stub shaft;
whereby the coupling converts rotor orbiting and rotation into rotational drilling motion about an axis displaced from and parallel to said rotor axis.

9. The drilling apparatus of claim 8, wherein the joint assembly further includes a plurality of concentric annular extensions secured to each of the second end of the first portion, the first end of the third portion and the first and second ends of the second portion, the concentric annular extensions formed on the first and third portion being spaced so as to fit within spaces between the concentric annular extensions formed on the second portion such that the annular extensions on the first and third portions can be interleaved with the annular extensions on the second portion, the joint assemblies further comprising an elastomeric layer between the interleaved annular extensions of the first and third portions and the second portions, the elastomeric layer being flexible in shear so as to allow pivoting of the first and third portions with respect to the second portion.

10. The drilling apparatus of claim 9, wherein the joint assembly further comprises a thrust load bearing element in direct contact with both the first and second portions and another thrust load bearing element in direct contact with both the second and third portions such that thrust loads can be directly transmitted through the first, second and third portions and the thrust bearing elements.

11. The drilling apparatus of claim 9, wherein the joint assembly further comprises at least one radial pin extending through each of the interleaved annular extensions of two adjacent portions, the radial pin being in direct contact with the annular extensions of one of the portions and spaced from the extensions of the other portion so as to flexibly interlock the interleaved annular extensions.

12. A progressive cavity drive train for use in a downhole drilling apparatus, the progressive cavity drive train comprising:

a housing structure;

a stator, the stator having a longitudinal axis;

a rotor having a true center, the rotor being located within the stator; the stator and rotor each having coacting helical lobes which are in contact with one another at any transverse section, the stator having one more helical lobe than the rotor such that a plurality of cavities are defined between the rotor and the stator, and the rotor being adapted to rotate within the stator such that the true center of the rotor orbits the axis of the stator, the orbit causing a progression of the cavities in the direction of the axis of the stator;

a first stub shaft having opposed longitudinal ends, the first stub shaft being secured at one longitudinal end thereof to the rotor for movement therewith;

a first joint assembly having opposed longitudinal ends, the opposed longitudinal ends of the first joint assembly being pivotable with respect to one another and one of the longitudinal ends of the joint assembly being secured to the first stub shaft for movement therewith;

an intermediate shaft having first and second longitudinal ends, the first longitudinal end of the intermediate shaft being secured to the second longitudinal end of the first joint assembly for movement therewith, the first joint assembly thereby connecting the first stub shaft to the intermediate shaft for pivotable movement;

a second joint assembly having first and second longitudinal ends, the first and second longitudinal ends of the joint assembly being pivotable with respect to one another, the first longitudinal end of the joint assembly being secured to the second longitudinal end of the intermediate shaft for movement therewith;

a second stub shaft having first and second longitudinal ends, the first longitudinal end of the second stub shaft being connected to the second longitudinal end of the second joint assembly for movement therewith such that the second joint assembly connects the intermediate shaft to the second stub shaft for pivoting movement;

a drill bit drive shaft, the drill bit drive shaft being mounted for rotation about a predetermined axis and being operatively connected to the drill bit of the downhole drilling assembly for driving the drill bit, the drill bit drive shaft have first and second longitudinal ends, the first longitudinal end of the drill bit drive shaft being secured for movement with the second stub shaft so as to rotate therewith;

wherein the first joint assembly includes at least first, second and third portions which are movable with respect to one another and wherein the surfaces of these portions which move with respect to one another are perfectly isolated from the surrounding environment so as to preclude the entry of abrasives; and wherein the second joint assembly includes at least first, second and third portions which are movable with respect to one another and wherein the surfaces of the portions which are movable relative to one another are perfectly isolated from the surrounding environment so as to preclude the entry of abrasives.

13. The drive train of claim 12, wherein the joint assembly further includes a plurality of concentric annular extensions secured to each of the second end of the first portion, the first end of the third portion and the first and second ends of the second portion, the concentric annular extensions formed on the first and third portions being spaced so as to fit within spaces between the concentric annular extensions formed on the second portion such that the annular extensions on the first and third portions can be interleaved with the annular extensions on the second portion, the joint assemblies further comprising an elastomeric layer extending between and bonded to the interleaved annular extensions of the first and third portions and the second portions, the elastomeric layer being flexible in shear so as to allow pivoting of the first and third portions with respect to the second portion.

14. The drive train of claim 13, wherein the joint assembly further comprises a thrust load bearing element in direct contact with both the first and second portions and another thrust load bearing element in direct contact with both the second and third portions such that thrust loads can be directly transmitted through the first, second and third portions and the thrust bearing elements.

15. The drive train of claim 13, wherein the joint assembly further comprises at least one radial pin extending through each of the interleaved annular extensions of two adjacent portions, the radial pin being in direct contact with the annular extensions of one of the portions and spaced from the extensions of the other portion so as to flexibly interlock the interleaved annular extensions.

16. A progressive cavity drive train for causing rotation of a downhole drill bit drive shaft about a single axis, the progressive cavity drive train comprising:

a housing structure;

a stator, the stator having a longitudinal axis;

a rotor having a true center, the rotor being located within the stator; the stator and rotor being arranged with respect to one another such that a plurality of cavities are defined between the rotor and the stator, and the rotor being adapted to rotate within the stator such that the cavities between the rotor and stator progress in the direction of the axis of the stator;

a drill bit drive shaft mounted within the housing for rotation about a predetermined axis, the drill bit drive shaft having first and second longitudinal ends, the second longitudinal end being operatively connected to a drill bit for causing rotation of the drill bit about a predetermined axis;

a flexible coupling having first and second longitudinal ends, the first longitudinal end of the flexible coupling being connected to the rotor and the second longitudinal end of the flexible coupling being connected to the first end of the drill bit drive shaft, the flexible coupling comprising a first stub shaft having first and second longitudinal ends, a second stub shaft having first and second longitudinal ends and an intermediate shaft having first and second longitudinal ends, the second longitudinal end of the first stub shaft being pivotably connected to the first longitudinal end of the intermediate shaft and the first longitudinal end of the second stub shaft being pivotably connected to the second longitudinal end of the intermediate shaft; and wherein the pivotable connection between the first stub shaft and the intermediate shaft and the second stub shaft and the intermediate shaft is provided by a joint assembly, each such joint assembly comprising a longitudinally arranged first, second and third portions and a plurality of longitudinal extensions secured to each of the second end of the first portion, the first end of the third portion and the first and second ends of the intermediate second portion, the extensions formed on the first and third portions being spaced so as to fit within spaces between the extensions formed on the second portion such that the extensions on the first and third portions can be interleaved with the extensions on the second portion, the joint assemblies further comprising an elastomeric layer extending between and bonded to the interleaved extensions of the first and third portions and the second portion, the elastomeric layer being flexible in shear so as to allow pivoting of the first and third portions with respect to the second portion.

17. The drive train of claim 16, wherein the joint assembly further comprises a thrust load bearing element in direct contact with both the first and second portions and another thrust load bearing element in direct contact with both the second and third portions such that thrust loads can be directly transmitted through the first, second and third portions and the thrust bearing elements.

18. The drive train of claim 16, wherein the joint assembly further comprises at least one radial pin extending through each of the interleaved annular extensions of two adjacent portions, the radial pin being in direct contact with the annular extensions of one of the portions and spaced from the extensions of the other portion so as to flexibly interlock the interleaved annular extensions.

19. A progressive cavity drive train for causing rotation of a drill bit drive shaft about a single axis, the progressive cavity drive train comprising:

a housing structure;

a stator, the stator having a longitudinal axis;

a rotor having a true center, the rotor being located within the stator; the stator and the rotor each having coacting helical lobes which are in contact with one another at any transverse section, the stator having one more helical lobe than the rotor such that a plurality of cavities are defined between the rotor and the stator, and the rotor being adapted to rotate within the stator such that the true center of the rotor orbits the axis of the stator, the orbit having a predetermined radius and the orbit causing a progression of cavities in the direction of the axis of the stator;

a first stub shaft having a longitudinal axis and first and second longitudinal ends, the first end of the first stub shaft being connected to and movable with the rotor, the second end of the first stub shaft comprising a plurality of longitudinally extending concentric annular extensions;

an intermediate shaft, the intermediate shaft having first and second longitudinal ends, a plurality of longitudinally extending concentric annular extensions formed on each of the ends of the intermediate shaft, the annular extensions formed on the intermediate shaft being dimensioned and arranged so as to allow the annular extensions of the intermediate shaft to extend into spaces formed between the annular extensions of the first stub shaft so as to allow the first end of the intermediate shaft to be interleaved with the second end of the first stub shaft such that the annular extensions of the stub shaft and the intermediate shaft overlap one another and are spaced from one another;

an elastomer substantially filling the spaces between the annular extensions of the first stub shaft and the annular extensions of the first end of the intermediate shaft so as to provide a flexible connection between the first stub shaft and the intermediate shaft;

a second stub shaft having a longitudinal axis which is substantially colinear with the axis of the stator and first and second longitudinal ends, the second stub shaft being rotatably mounted about its longitudinal axis within the housing structure, the second end of the second stub shaft being operatively connected to the drill bit drive shaft for rotating the drill bit drive shaft about a predetermined axis, the first end of the second stub shaft being formed with a plurality of longitudinally extending concentric annular extensions, the annular extensions being dimensioned and spaced so as to fit within the spaces formed in the annular extensions formed on the second end of the intermediate shaft such that the annular extensions formed on the second end of the intermediate shaft and the annular extensions formed on the first end of the second stub shaft can be interleaved and so that when the annular extensions are so interleaved, a space is provided between the interleaved annular extensions;

and an elastomer substantially filling the space between the annular extensions of the second end of the intermediate shaft and the first end of the second stub shaft so as to flexibly couple the intermediate shaft to the second stub shaft; whereby the rotor is flexibly coupled to the drill bit drive shaft in a manner such that all moving parts of the coupling are perfectly isolated from the surrounding environment.

20. The drive train of claim 19, wherein the joint assembly further comprises a thrust load bearing element in direct contact with both the first and second portions and another thrust load bearing element in direct contact with both the second and third portions such that thrust loads can be directly transmitted through the first, second and third portions and the thrust bearing elements.

21. The drive train of claim 19, wherein the joint assembly further comprises at least one radial pin extending through each of the interleaved annular extensions of two adjacent portions, the radial pin being in direct contact with the annular extensions of one of the portions and spaced from the extensions of the other portion so as to flexibly interlock the interleaved annular extensions.

22. A coupling comprising: a first stub shaft having first and second longitudinal ends; a second stub shaft having first and second longitudinal ends and an intermediate shaft having first and second longitudinal ends; the second longitudinal end of the first stub shaft being pivotably connected to the first longitudinal end of the intermediate shaft and the first longitudinal end of the second stub shaft being pivotably connected to the second longitudinal end of the intermediate shaft; and
wherein the pivotable connection between the first stub shaft and the intermediate shaft and the second stub shaft and the intermediate shaft is provided by a joint assembly which includes a plurality of concentric annular extensions secured to each of the second end of the first stub shaft, the first end of the second stub shaft and the first and second ends of the intermediate shaft, the concentric annular extensions formed on the stub shafts being spaced so as to fit within spaces between the concentric annular extensions formed on the intermediate shaft such that the annular extensions on the stub shafts can be interleaved with the annular extensions on the intermediate shaft, the joint assemblies further comprising an elastomeric layer extending between and bonded to the interleaved annular extensions of the stub shafts and the intermediate shaft, the elastomeric layer being flexible in shear so as to allow pivoting of the stub shafts with respect to the intermediate shaft.

23. The coupling of claim 22, wherein the joint assembly further comprises a thrust load bearing element in direct contact with both the first and second portions and another thrust load bearing element in direct contact with both the second and third portions such that thrust loads can be directly transmitted through the first, second and third portions and the thrust bearing elements.

24. The coupling of claim 22, wherein the joint assembly further comprises at least one radial pin extending through each of the interleaved annular extensions of two adjacent portions, the radial pin being in direct contact with the annular extensions of one of the portions and spaced from the extensions of the other portion so as to flexibly interlock the interleaved annular extensions.

* * * * *